(12) United States Patent
Rosenblatt et al.

(10) Patent No.: US 6,716,354 B2
(45) Date of Patent: Apr. 6, 2004

(54) METHODS OF TREATING WATER USING COMBINATIONS OF CHLORINE DIOXIDE, CHLORINE AND AMMONIA

(75) Inventors: Aaron A. Rosenblatt, New York, NY (US); Thomas E. McWhorter, Allentown, PA (US); David Rosenblatt, Baltimore, MD (US); Dale Genther, Allentown, PA (US); Keith Muller, Saylorsburg, PA (US)

(73) Assignee: CDG Technology, Inc., Bethlehem, PA (US)

( * ) Notice: Subject to any disclaimer, the term of this patent is extended or adjusted under 35 U.S.C. 154(b) by 0 days.

(21) Appl. No.: 09/801,507

(22) Filed: Mar. 8, 2001

(65) Prior Publication Data

US 2002/0125196 A1 Sep. 12, 2002

(51) Int. Cl.$^7$ .................................................. C02F 1/76
(52) U.S. Cl. ....................... 210/638; 210/705; 210/721; 210/752; 210/754; 210/764; 210/908; 422/37; 423/477; 424/661; 424/719
(58) Field of Search ................................ 210/705, 721, 210/752, 754, 764, 908, 638; 422/37; 423/477, 479; 424/661, 662, 719

(56) References Cited

U.S. PATENT DOCUMENTS

| | | | |
|---|---|---|---|
| 3,502,443 A | | 3/1970 | Westerlund .................... 23/282 |
| 3,607,027 A | | 9/1971 | Westerlund .................... 23/152 |
| 3,733,266 A | * | 5/1973 | Bishop et al. ............... 210/668 |
| 3,895,100 A | | 7/1975 | Cowley ........................ 423/478 |
| 3,975,284 A | * | 8/1976 | Lambert ................. 252/187.22 |
| 3,975,505 A | | 8/1976 | Fuller .......................... 423/478 |
| 4,137,296 A | | 1/1979 | Glew et al. .................. 423/478 |
| 4,247,531 A | | 1/1981 | Hicks .......................... 423/477 |
| 4,317,813 A | * | 3/1982 | Ridgway ...................... 424/616 |
| 4,336,228 A | | 6/1982 | Cowley ........................ 422/129 |
| 4,504,442 A | | 3/1985 | Rosenblatt et al. ............ 422/37 |
| 4,590,057 A | | 5/1986 | Hicks .......................... 423/477 |
| 4,614,595 A | * | 9/1986 | Azzarella et al. ............ 210/754 |
| 4,681,739 A | | 7/1987 | Rosenblatt et al. ............ 422/37 |

(List continued on next page.)

FOREIGN PATENT DOCUMENTS

| | | |
|---|---|---|
| CA | 956783 | 10/1974 |
| CA | 956784 | 10/1974 |
| CA | 976726 | 10/1975 |
| CA | 1049950 | 3/1979 |
| CA | 1136378 | 11/1982 |
| CA | 1195477 | 10/1985 |

OTHER PUBLICATIONS

"Chlorine Oxides and Chlorine Oxygen Acids", Ullmann's Encyclopedia of Industrial Chemistry, vol. A6, 1986, pp. 497–498.
G. C. White, "Handbook Of Chlorination And Alternative Disinfectants", John Wiley & Sons, Inc., 1999, pp. 1153–1202.
G. C. White, "Handbook Of Chlorination And Alternative Disinfectans", John Wiley & Sons, Inc., 1999, pp. 1153.
Search Report dated Jul. 24, 2002 for International Application No. PCT/US 02/06061 dated Feb. 27, 2002.

*Primary Examiner*—Peter A. Hruskoci
(74) *Attorney, Agent, or Firm*—Ratner Prestia

(57) ABSTRACT

Raw water is treated with chlorine, chlorine dioxide and ammonia in various stages as it proceeds from raw water acquisition through clarification (e.g., coagulation, flocculation, sedimentation, and filtration) to storage of finished water from which the treated water can be introduced into a distribution system. Chlorine dioxide can be used as a pre-oxidant or disinfectant. Chlorine can be used as a disinfectant or to react with ammonia to produce monochloramine.

35 Claims, 7 Drawing Sheets

U.S. PATENT DOCUMENTS

| | | | | |
|---|---|---|---|---|
| 4,693,832 A | * | 9/1987 | Hurst | 210/752 |
| 4,851,198 A | | 7/1989 | Lohrberg | 422/193 |
| 4,908,188 A | | 3/1990 | Jefferis, III et al. | 422/111 |
| 5,110,580 A | | 5/1992 | Rosenblatt et al. | 423/472 |
| 5,204,081 A | | 4/1993 | Mason et al. | 423/478 |
| 5,234,678 A | | 8/1993 | Rosenblatt et al. | 423/477 |
| 5,290,524 A | | 3/1994 | Rosenblatt et al. | 422/305 |
| 5,314,629 A | * | 5/1994 | Griese et al. | 210/202 |
| 5,326,546 A | | 7/1994 | Rosenblatt et al. | 423/241 |
| 5,458,858 A | | 10/1995 | Dawkins | 422/234 |
| 6,315,950 B1 | * | 11/2001 | Harp et al. | 422/28 |

* cited by examiner

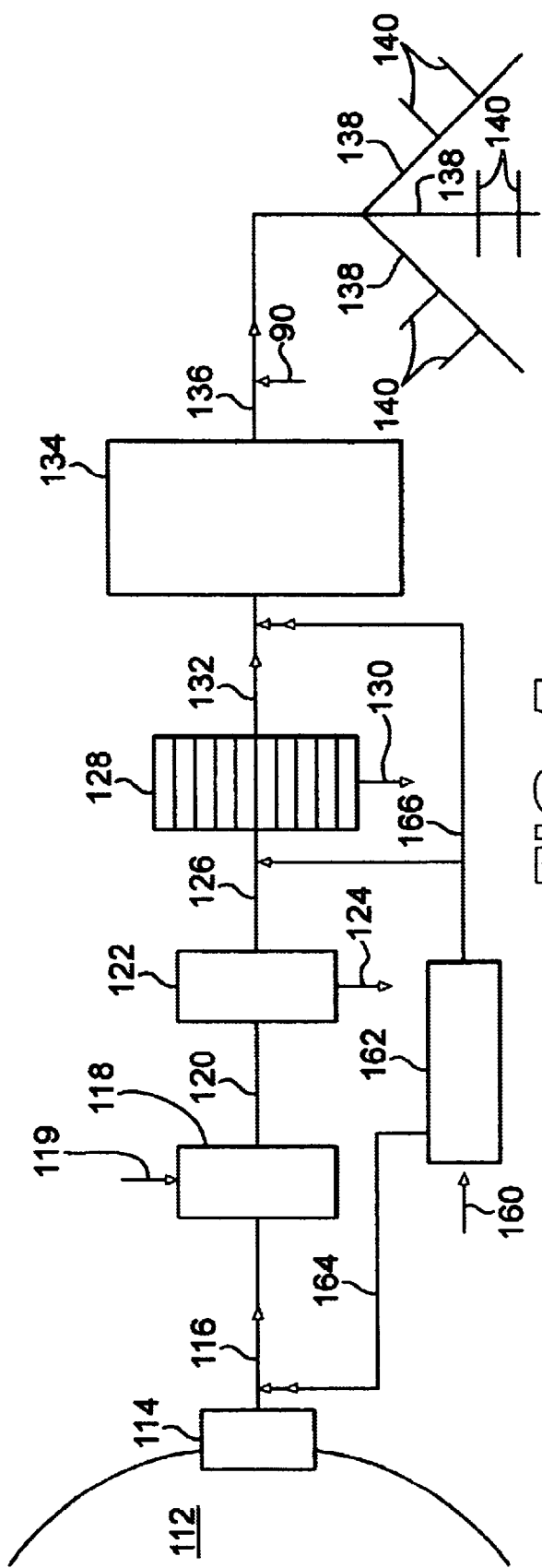

US 6,716,354 B2

METHODS OF TREATING WATER USING COMBINATIONS OF CHLORINE DIOXIDE, CHLORINE AND AMMONIA

CROSS REFERENCE TO RELATED APPLICATIONS

Not Applicable

STATEMENT REGARDING FEDERALLY SPONSORED RESEARCH OR DEVELOPMENT

Not applicable

BACKGROUND OF THE INVENTION

The present invention pertains to treatment of drinking water and, in particular, to the use of chlorine dioxide, chlorine, ammonia and mixtures thereof in various stages of currently used drinking water treatment processes.

Chlorine ($Cl_2$), chlorine dioxide ($ClO_2$), ozone ($O_3$) and monochloramine ($NH_2Cl$) are the chemical disinfectants most commonly used in treating drinking water. Sodium hypochlorite (NaOCl) solution is sometimes used in place of chlorine gas to produce essentially the same chemical species in the drinking water. These species ($Cl_2$, HOCl, and $OCl^-$) are individually and collectively referred to as "free available chlorine", or "chlorine". The term "Chlorine", as used in this document includes chlorine gas and/or any of the various species formed by dissolving chlorine in water. Monochloramine is created by mixing chlorine and ammonia, typically by injection of chlorine into water containing an excess amount of ammonia, i.e., more than two moles of ammonia per mole of chlorine injected.

In addition to the foregoing, other chemicals, such as potassium permanganate ($KMnO_4$), also serve as oxidants in drinking water. Oxidants can aid in removal of dissolved metals and destruction of some problem organic compounds.

In a typical drinking water-treatment plant, raw water is drawn from a lake, reservoir, river, stream, underground aquifer, or other body of water. Various chemicals are added to the raw water to oxidize contaminants, achieve disinfection and/or enhance removal of solids during subsequent process steps. The water is then subjected to various solids-removal steps that typically include coagulation, sedimentation and filtration. Alternatively, solids removal may be achieved through other processes, such as dissolved air flotation and membrane separation. Following solids removal, the water typically flows to a finished water storage facility and then to a distribution system.

The extent of disinfection in drinking water is a function of the concentration of the disinfectant and the time the disinfectant is in contact with pathogens. A common expression of the level of disinfection achieved is the term "CxT" (concentration C, multiplied by contact time T). The concentration of a disinfectant declines as it reacts with contaminants in the water. The degree of disinfection at a given CxT level is a function of many variables, including temperature and pH. There are complex rules for calculating CxT, and there are governmental guidelines for, and regulations mandating, the levels of CxT required for safe drinking water. Each disinfectant has a different set of CxT values necessary to achieve the levels of disinfection required for each type of pathogen, (e.g. virus, bacteria, encysted parasites) under various treatment conditions.

Historically, drinking water treatment plants have used chlorine as an oxidant and disinfectant. Chlorine, however, reacts with organic compounds in the water to produce halogenated by-products such as trihalomethanes (THMs) and haloacetic acids (HAAs). There is increasing evidence showing that these compounds are probably carcinogenic. There is also increasing evidence that these compounds may cause other adverse health effects, such as an increase in the incidence of miscarriage among pregnant women. Government regulations have continued to lower the maximum allowable levels of these compounds in drinking water.

In contrast to chlorine, chlorine dioxide does not chlorinate organic compounds to a significant degree; rather, it oxidizes material through a variety of largely, one-electron transfer mechanisms. When added to natural water for the purposes of oxidation and/or disinfection, it does not produce halogenated byproducts (e.g., THMs) to any appreciable extent. Compared to chlorine, chloramines have less oxidation potential. Because chloramines do not react as quickly as chlorine with organic material, the amount of halogenated by-products produced is significantly lower than with chlorine. Ozone does not produce THMs or HAAs, but it can produce other problematic by-products, such as bromate ion, depending upon the composition of the water.

SUMMARY OF THE INVENTION

Chlorine, chlorine dioxide and ammonia, as gases or aqueous solutions, can be used in various combinations in the process of treating drinking water. Chlorine dioxide can be used as an oxidant and as a disinfectant. For either purpose it can be introduced into early or later stages of the water treatment process.

Chlorine dioxide for treatment of drinking water is typically produced by reaction of chlorine and sodium chlorite, as taught in U.S. Pat. No. 5,110,580. Chlorine dioxide can be produced at lower cost through other processes such as acidification of sodium chlorate ($NaClO_3$). However, this lower-cost chlorine dioxide is produced as a mixture with chlorine. In the prior art, it was necessary to separate the chlorine from the chlorine dioxide and recycle the chlorine using complex and expensive process steps, e.g., by the Day-Kesting Process described in Ullman's Encyclopedia of Industrial Chemistry 5$^{th}$ ed. 1986, Wersheim, New York, N.Y.

Chlorine, chlorine dioxide, and monochloramine are used in various ways to oxidize contaminants and to disinfect drinking water. Chlorine dioxide and chloramine are used individually in drinking water, but not injected together. Typically, chlorine dioxide is injected early in the treatment process, while chloramine is used near the end of the treatment process.

The present invention has, at its core, the use of a mixed stream of chlorine and chlorine dioxide, sometimes with ammonia, to disinfect and preoxidize drinking water while minimizing production of THMs and HAAs.

All three components (chlorine, chlorine dioxide and ammonia) can be introduced together into the raw water. The chlorine dioxide provides rapid disinfection and, in the typical application, is consumed almost as rapidly. The chlorine and ammonia combine to form monochloramine, which provides slower but long-lasting disinfection. Monochloramine typically will persist in the water throughout the process and into the storage and distribution of the clean, potable water.

Thus, in its broadest aspect, the present invention is a method of treating water to produce residual monochloramine and chlorine dioxide in the water, comprising the steps of: injecting a mixture of chlorine and chlorine dioxide into the water together with ammonia, the ammonia being present in an amount sufficient to produce residual monochloramine, with substantially no chlorine in the water.

In another aspect, the present invention is a method for treating water as it proceeds from a source to a storage or distribution facility, comprising the steps of: injecting a mixture of chlorine and chlorine dioxide into the water at a location between the source and the storage or distribution facility; and injecting ammonia into the water either upstream or downstream of the location where the chlorine and chlorine dioxide are injected into the water, the ammonia being injected in an amount to substantially react with the chlorine, whereby the water in the storage or distribution facility contains chlorine dioxide, monochloramine and a negligible amount of chlorine.

Therefore, yet another aspect the present invention is a method for treating water using a stream containing chlorine and chlorine dioxide, comprising the steps of: separating the chlorine from the chlorine dioxide to yield a stream of chlorine and a stream of chlorine dioxide; using the stream of chlorine dioxide to pre-oxidize a stream of raw water prior to subsequent steps for removal of solids; and using the stream of chlorine to disinfect the water after some solids have been removed from the water, but prior to storage for distribution.

Since chlorine dioxide decomposes in sunlight, application of the chlorine dioxide at the entrance to the raw water main can sometimes provide a long, dark, well-mixed vessel (i.e., the raw water main) where the chlorine dioxide can effectively react with contaminants.

A further aspect of the present invention is a method for treating and disinfecting raw water comprising the steps of: introducing a mixture of chlorine, chlorine dioxide and excess ammonia into the raw water to provide disinfection of the water by chlorine dioxide, and to create monochloramine by reaction of chlorine and ammonia; passing the raw water through further treatment steps wherein solids are removed and whereby residual chlorine dioxide is consumed prior to filtration; and collecting a finished potable water containing residual monochloramine to provide residual disinfection of the finished water.

In some situations, it is not economical to disinfect raw water using chlorine dioxide because high levels of contaminants in the raw water consume too much chlorine dioxide before adequate CxT credit is achieved. Some disinfection is needed throughout the plant to suppress biological growth in basins and filters. In these cases, chlorine and ammonia may be fed into the raw water. The resulting chloramine persists through the entire plant process and serves to suppress biological growth, without producing any appreciable amount of THMs and HAAs. Substantial amounts of the contaminants in the raw water are removed during the solid removal steps, after which a relatively smaller dose of chlorine dioxide may be applied to the filtered water to achieve disinfection. This may or may not be done in conjunction with feeding a relatively small dose of chlorine dioxide into the raw water to help to remove metals and, to aid in coagulation/sedimentation.

A further aspect of the present invention is a method of treating contaminated raw water comprising the steps of: a) introducing chlorine and ammonia into the raw water to produce residual monochloramine, which suppresses biological growth in the water as it proceeds through subsequent processing steps; b) passing the water from step "a" through solids removal processes; and c) disinfecting the water after solids removal and prior to storage with one of: 1) chlorine dioxide; 2) a mixture of chlorine dioxide and chlorine; or 3) a mixture of chlorine dioxide, chlorine and ammonia.

Still another aspect of the present invention is a method of treating raw water using streams of chlorine dioxide, chlorine and ammonia comprising the steps of: a) introducing chlorine dioxide into raw water by injection into a raw water main; b) subjecting the raw water containing chlorine dioxide to solids removal processes; c) introducing additional chlorine dioxide into the water as it is withdrawn from the solids removal process and conducted to finished water storage; and d) introducing chlorine and ammonia into water withdrawn from storage for distribution to users to provide monochloramine in the water by reaction of chlorine and ammonia.

BRIEF DESCRIPTION OF THE DRAWINGS

FIG. 5 is a schematic representation of a process according to the present invention using chlorine dioxide for pre-oxidation and chlorine for primary disinfection.

FIG. 5a is a schematic representation of an alternate method of using a mixed chlorine/chlorine dioxide stream in the process of FIG. 5.

FIG. 5b is a schematic representation of an alternate method of further treating the dilute mixed stream of chlorine dioxide and chlorine in the process of FIG. 5.

DETAILED DESCRIPTION OF THE INVENTION

Figure 1:
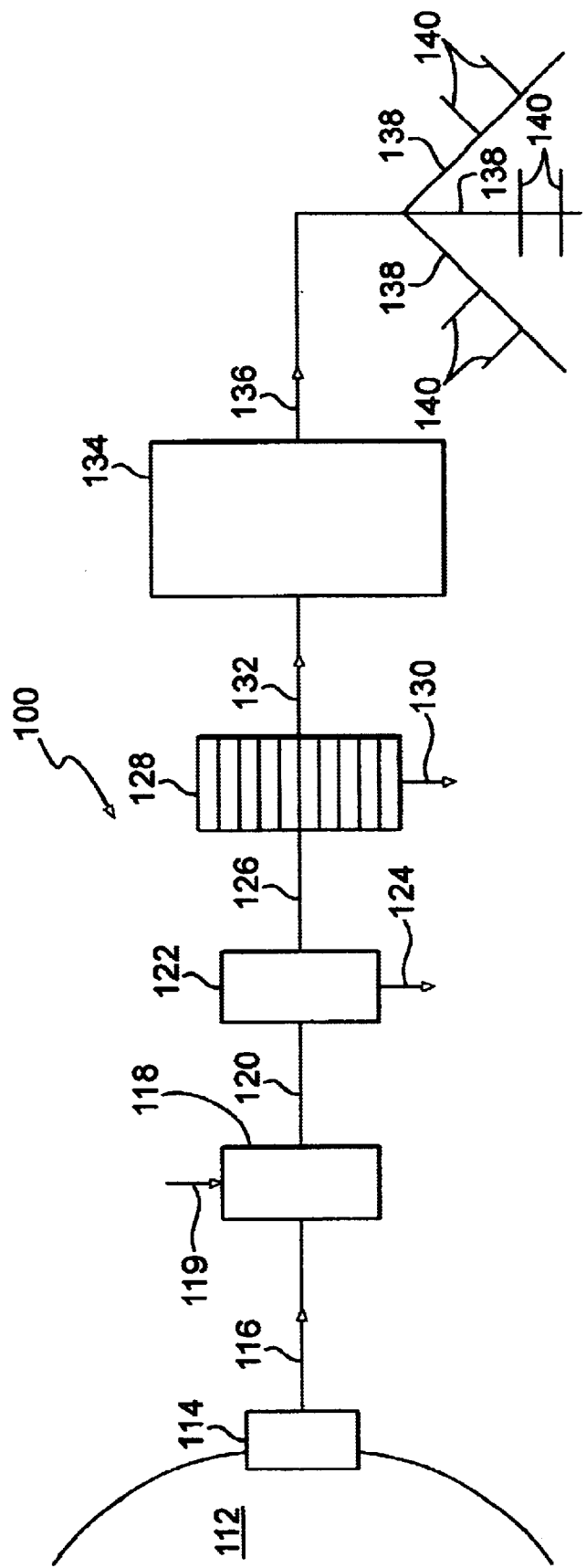
FIG. 1 is a schematic representation of a typical drinking water purification process.

A conventional drinking water purification process shown as 100 in FIG. 1 involves a source of water 112 which can be a lake, river, reservoir, aquifer or other body of water. Water from the source 112 enters an intake structure 114. Depending upon the relative elevation of the water source 112 and the treatment facility, the water then flows by gravity or is pumped through a raw water main 116 to a rapid mix tank 118 where chemicals 119 such as pH adjusters, coagulants and disinfectants are added. The water then flows through a suitable conduit 120 into flocculation and sedimentation apparatus 122 where slow mixing causes solids to coagulate and settle to the bottom of the tank where they are removed, as indicated by arrow 124. (In some plants, coagulated solids are removed through other processes such as dissolved air flotation.) The settled water then flows through a suitable conduit 126 into a filter system 128, where it is passed through beds of sand, crushed anthracite and/or other granular materials. In some plants, filtration is achieved by forcing the water under pressure through membranes. Fine suspended solids are removed by the filter medium. When the filter medium becomes filled with solid particles, it is back washed to remove the solids, as shown by arrow 130. The clean water from the filtration step 128 is then moved by suitable conduit 132 into a finished water reservoir or storage facility 134. Water can be withdrawn from the finished water storage 134 and introduced into a distribution piping system, which includes a primary main 136, secondary mains 138, and laterals 140 for introduction into individual users' homes or businesses.

There are many variations on the basic set of processes used to treat drinking water. In many applications, chlorine and chlorine dioxide interact in synergistic ways to accomplish disinfection of the water. For example. as chlorine dioxide reacts with contaminants, it forms chloride ($Cl^-$) and chlorite ($ClO^-_2$) ions. Typically, the net amount of chlorite ion produced is equal to about 50 to 70% of the weight of the chlorine dioxide applied. In the presence of chlorine, the chlorite ion is converted back to chlorine dioxide. Thus, chlorine dioxide is regenerated. In the distribution system, the regeneration of chlorine dioxide can cause minute quantities of chlorine dioxide to be released at the tap and into the atmosphere of homes when the water is running. This usually is not a problem. However, in the presence of new carpet, new paint or other sources of certain volatile organic compounds (VOCs), the interaction of chlorine dioxide and the VOCs produces a strong and objectionable odor which has variously been likened to the odor of cat urine and kerosene This odor-causing reaction is well documented, but is still not well understood.

Therefore, the level of chlorite entering the distribution system should be maintained at or below a low level (e.g., 0.2 mg.) if chlorine is used as a residual disinfectant in the distribution system. In such a case, the maximum acceptable level of chlorite ion entering the distribution system is a function of many variables, such as water chemistry, temperature, and retention time in the distribution system. Since chlorine dioxide reacts very quickly with contaminants in the water, the residual chlorine dioxide in the finished water leaving the water treatment plant is usually far below the level at which interaction of chlorine dioxide with VOCs will occur. However, if chlorine is used for residual disinfection, the chlorine may react with chlorite ions to regenerate chlorine dioxide in the finished water long after the water leaves the plant. There are two solutions to this problem. These are:

1. Remove the chlorite ion after the chlorine dioxide has accomplished its function, so that there is little chlorite ion left (e.g., <0.2 ppm) to react with chlorine to regenerate chlorine dioxide "at the tap". Chlorite ion removal, e g., with ferrous or sulfite ions, is established technology, and may be necessary in any case if the application requires a chlorine dioxide dosage at which attendant chlorite ion levels would exceed the regulatory limit. (1 ppm. In the USA)
2. Use monochloramine for residual disinfection. Monochloramine does not react to any significant extent with chlorite ion to regenerate chlorine dioxide in the distribution system.

Although monochloramine is a weaker disinfectant than either chlorine dioxide or chlorine, monochloramine is sometimes preferred over chlorine for residual disinfection in the distribution system. This is especially true in areas of the country where there are very long distribution pipes. Monochloramine persists longer than chlorine and maintains a more reliable residual for disinfection in distribution systems with long retention times.

In some water, chlorine reacts with compounds such as phenols to produce noxious, bad-smelling compounds such as chlorophenols. Monochloramine and chlorine dioxide do not produce these odor causing compounds to any appreciable extent. Also, monochloramine reacts much more slowly with organic material than does chlorine, thereby helping to minimize the production of THMs and HAAs.

Figure 2:
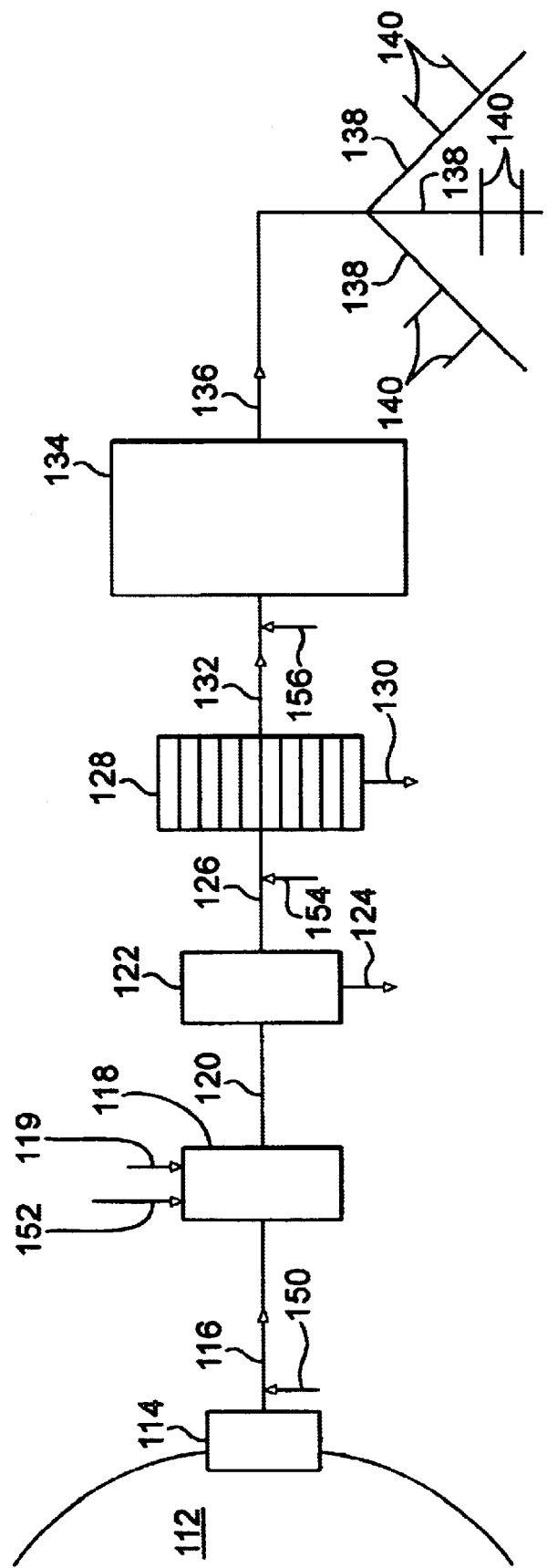
FIG. 2 is a schematic drawing of a typical water purification plant using a total chlorination scheme.

FIG. 2 is a schematic representation of a typical approach to oxidation and disinfection in a typical drinking water plant. If the incoming water contains certain kinds of contaminants, pre-oxidation may be required in order to achieve water quality objectives. Chlorine, as shown by arrow 150, may be introduced into the raw water main or, as shown by arrow 152, into the rapid-mix tank 118. Chlorine may also be injected into the settled water before the filters, as shown by arrow 154, to prevent biological growth in the filters. Any combination of these injection points is possible. Chlorine, as shown by arrow 156, may be injected as the water flows into the finished water storage facility 134. The chlorine introduced into the finished water provides added disinfection and boosts the residual chlorine that is carried into the distribution system 136, 138, 140. If desired, ammonia may be added prior to the distribution in the main 136 if monochloramine is employed as a residual disinfectant in the water delivered to the users.

The amount of THMs and HAAs formed during chlorination is a function of the type and concentration of organic precursors in the treated water, as well as of the concentration of chlorine and the reaction time available. Because of concerns about THMs and HAAs, many plants will probably not be able to use chlorine in the raw water in the future, and many will probably not be able to use it in the later stages of treatment. Therefore, in most plants new treatment approaches must be devised.

Figure 3:
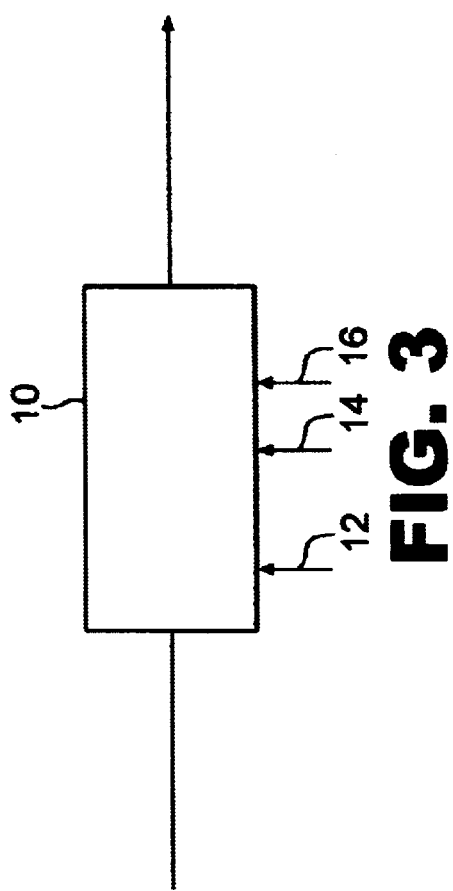
FIG. 3 is a schematic representation of a basic process according to the present invention.

In a broad aspect, the present invention is a process for treating raw water as shown schematically in FIG. 3. In FIG. 3, box 10 represents a quantity of raw water. The raw water is treated by introducing chlorine 12 and chlorine dioxide 14 into the water 10 along with a quantity of ammonia intended to react with the chlorine to produce residual monochloramine without leaving more than a trace quantity of chlorine in the water. The chlorine dioxide removes contaminants and disinfects the water, while the monochloramine persists for long term disinfection of the water 10.

Figure 4:
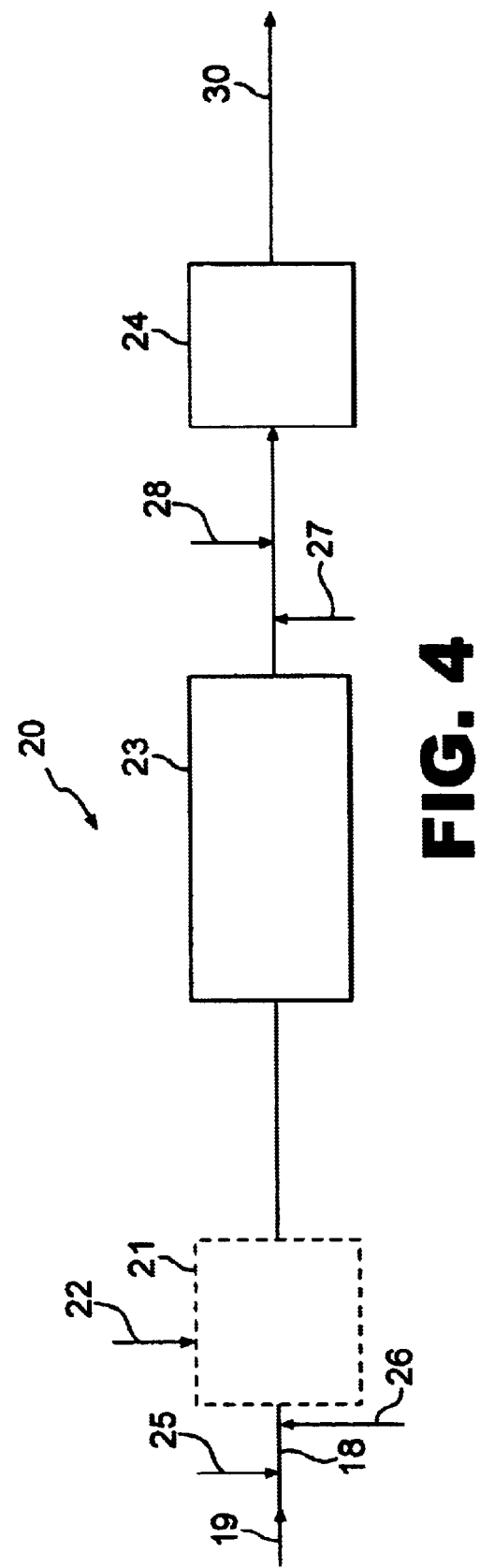
FIG. 4 is a schematic representation of application of the processes of the present invention in a water treatment process.

FIG. 4 schematically illustrates treating water in a continuous process 20 according to the present invention. The process 20 takes raw water, represented by arrow 19 through an intake or main 18, where a mixture of chlorine and chlorine dioxide represented by arrow 26 and ammonia represented by arrow 25 are added. Depending upon the contaminants in the water, the water containing oxidants can be passed through an optional step 21 where other chemicals, such as coagulants, pH adjusters etc., represented by arrow 22 are introduced into step 21. Thereafter, the partially treated raw water is subjected to solids removal represented by box 23, which may include, e.g., sedimentation, filtration, dissolved air flotation, and membrane separation. Water exiting the solids-removal step 23 is conducted directly to a distribution system or storage represented by box 24. According to the present invention, ammonia represented by arrow 25 and chlorine and chlorine dioxide represented by arrow 26 may be introduced into the water prior to entering the solids-removal step 23. In many cases, treatment of raw water will involve using a pre-oxidant step prior to the solids-removal step. In these cases, the ammonia 25 and chlorine and chlorine dioxide 26 are introduced during this step. At this stage, the chlorine reacts with the ammonia to produce monochloramine that will persist in the water through solids removal, storage, and/or distribution and chlorine dioxide, that provides immediate disinfectant to the water, as would chlorine. Monochloramine provides some level of disinfection throughout the overall process, and would help to prevent algal grow in the solids removal equipment.

Alternatively, ammonia represented by arrow 27 and chlorine and chlorine dioxide, represented by arrow 28, can be introduced after the solids removal step to provide the same beneficial effects as discussed above. In certain cases the process can include introducing ammonia and chlorine and chlorine dioxide both before and after the solids-removal step.

FIG. 5 is a schematic representation of another variation of such a new water treatment process according to the present invention, used with conventional drinking water treating equipment.

In the process of FIG. 5, a mixture of chlorine and chlorine dioxide represented by arrow 160 is sent to a separation facility 162 which yields a first stream of chlorine dioxide with negligible amounts of chlorine represented by arrow 164 and a second stream of chlorine represented by line 166. There are known processes for separating chlorine from chlorine dioxide, any of which can be used effectively with the present invention. As shown in FIG. 5, the chlorine 166 and chlorine dioxide 164 are two disinfectants used at different points in the water treatment process. In some processes (plants), (depending upon the water chemistry) chlorine can be used without creating THMs or HAAs above acceptable limits if the chlorine is applied after the water has been partially or wholly treated. This is because some of the precursors for THM/HAA formation are removed or oxidized in the early stages of the treatment process. Therefore, according to the present invention, the chlorine dioxide is introduced early in the process and preferably into the raw water main 116 and the chlorine is introduced into the filtered water in conduit 132 or the settled water in conduit 126. In the process of FIG. 5, chlorine dioxide applied to the raw water achieves oxidation and some disinfection. Chlorine applied to the water after filtration achieves additional disinfection. Since THM and HAA formation is a function of time, sometimes chlorine can be applied before the filters, where it also suppresses biological growth in the filters. Retention time in filters is typically very short, whereas retention time in flocculation and sedimentation is typically longer. The chlorine uses the contact time with the finished water storage to achieve additional CxT credit and to maintain a disinfectant residual. Ammonia can be introduced, as shown by arrow 90, into the finished water in conduit 136 prior to being distributed in order to produce monochloramine to serve as a residual disinfectant in the distribution system.

In another aspect of the invention, some or all of the mixed chlorine/chlorine dioxide stream, when in gaseous form, may be converted to chlorine dioxide by passing the mixed stream through a porous bed of solid sodium chlorite according to the process disclosed and claimed in U.S. Pat. No. 5,110,580, the specification of which is incorporated herein by reference. The chlorine will be converted to chlorine dioxide and the chlorine dioxide will pass through the process unchanged.

As shown in FIG. 5a, all or part of a mixed chlorine/chlorine dioxide stream 160 can be sent to a unit 163 containing a porous bed of solid sodium chlorite, wherein the chlorine is converted to chlorine dioxide as taught in the '580 patent, and the chlorine dioxide passes through the bed unchanged into the product stream 165. The product stream 165 from reactor 163 will be substantially pure chlorine dioxide for injection into the raw water as shown in FIG. 5.

In FIG. 5b, the gas separation facility 162 produces a stream 164 of chlorine dioxide containing negligible amounts of chlorine gas and a stream 166 containing chlorine gas. A portion of the inlet stream 160 of chlorine and chlorine dioxide gas can be sent to unit 163 containing solid sodium chlorite, wherein the chlorine gas is converted to chlorine dioxide gas, yielding a chlorine dioxide stream 165 which can be mixed with stream 164 and used in accordance with the process of FIG. 5.

The chlorine dioxide can be used as a pre-oxidant to partially destroy or reduce THM/HAA precursors. If enough of the precursors are destroyed, chlorine may then be applied without creating unacceptable levels of THMs or HAAs.

According to the present invention, another aspect is to produce a water stream containing a mixture of dissolved chlorine dioxide and monochloramine. The resulting chlorine dioxide/monochloramine stream is ideal for disinfection in many water treatment plants. Chlorine dioxide is a very rapid disinfectant, but is not globally accepted as a residual disinfectant in the water distribution system. Monochloramine is a very slow disinfectant, but provides a long-lasting residual. In some drinking water plants with long retention times, monochloramine can be used as a primary disinfectant. In most cases, however, there is not enough retention time for monochloramine to achieve the CxT levels necessary to provide primary disinfection. A major drawback to the use of monochloramine as a residual disinfectant is that the excess ammonia sometimes promotes growth of nitrifying organisms in distribution systems. Recent research shows that the chlorite ion, a by-product of chlorine dioxide disinfection, inhibits growth of the nitrifying organisms. Therefore, use of chlorine dioxide in conjunction with monochloramine mitigates the nitrification problem associated with maintenance of a monochloramine residual, while use of monochloramine residual solves the problem of odors in homes with new carpets that may occur when chlorine dioxide is used in conjunction with any chlorine residual in the water.

Use of chlorine, even in the later stages of the purification process, may be even more limited in the future as allowable limits of THMs and HAAs are lowered.

Figure 6:
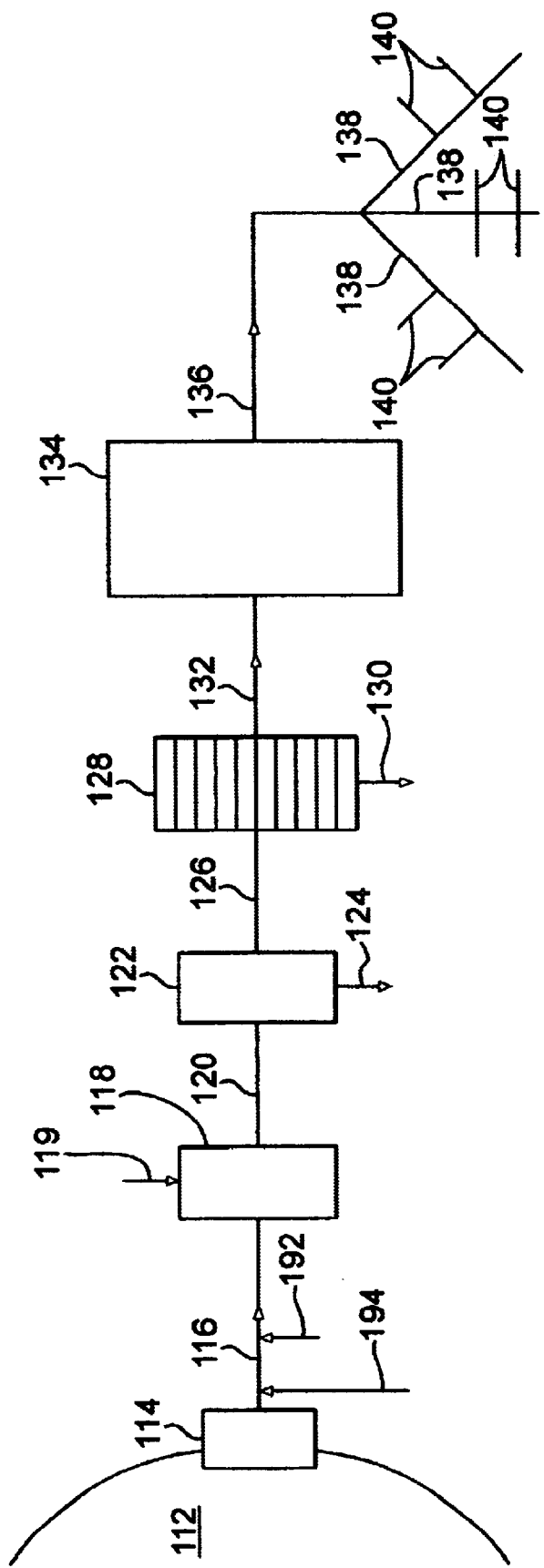
FIG. 6 is a schematic representation of a process according to the present invention using a combination of chlorine dioxide and monochloramine for total disinfection and oxidation.

Referring to FIG. 6, there is shown a process for using chlorine dioxide in conjunction with chloramine in the water treatment scheme. A mixture of chlorine dioxide and chlorine, shown by arrow 192, is injected into the raw water main 116 with an excess of ammonia represented by arrow 194. The chlorine:ammonia ratio should be at or below about 5:1 by weight, depending upon the pH of the water. For example, in a low pH environment the following overall reaction takes place: $NH_3+Cl_2 \rightarrow NH_2Cl+HCl$ and in a higher pH environment the overall reaction proceeds according to the following equation: $2NH_3+Cl_2+2OH \rightarrow 2NH_2Cl+2H_2O$. Ideally, the chlorine dioxide/monochloramine is injected as near to the raw water intake as possible, so that the volume of the raw water main provides retention time for raw water with the oxidants and disinfectants.

In relatively clean raw water with a very long raw water main, the chlorine dioxide may achieve sufficiently high CxT to provide adequate disinfection during the time it travels through the raw water main. If there is a residual of chlorine dioxide at the rapid mix tank 118, much of the residual chlorine dioxide may be lost either through degassing from the water due to the rapid mixing, or through photolysis and reaction in the subsequent flocculation and sedimentation step 122. This vulnerability to photolysis is because many of the flocculation/sedimentation basins are open to the air. In contrast to chlorine dioxide, the monochloramine present in the water in the process shown in FIG. 6 does not dissipate significantly on rapid mixing, nor does it experience rapid photolytic decomposition. The monochloramine is carried through the rest of the process and into the distribution system 136, 138, 140 where it provides a disinfecting residual.

In systems where the raw water is more contaminated, the demand for chlorine dioxide exerted by the raw water may be too high to permit adequate, economical disinfection in the raw water main. In these cases, a small dose of chlorine dioxide/monochloramine may be added to the raw water main. The chlorine dioxide is added for pre-oxidation, and is typically completely consumed in the raw water or early in the treatment process. The monochloramine is carried through the plant, where it provides some disinfection, helps to control algal growth in open basins and helps to prevent biological growth in the filters.

Figure 7:
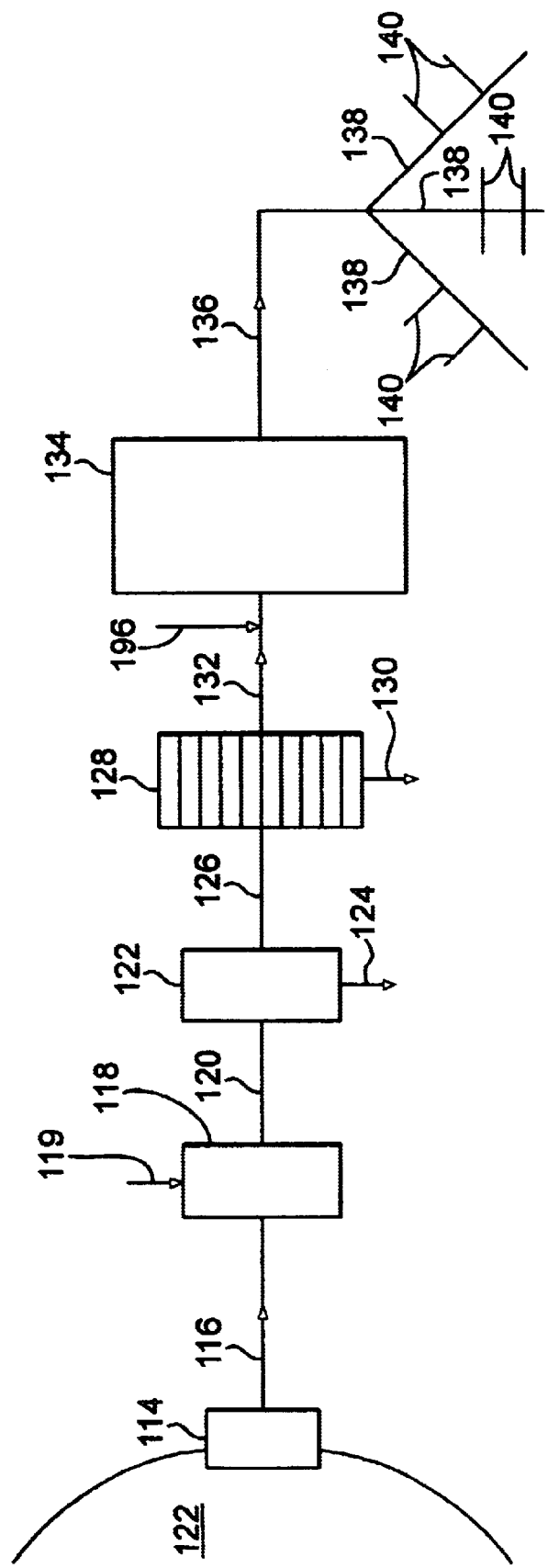
FIG. 7 is a schematic representation of a process according to the present invention using combined chlorine dioxide/monochloramine disinfection with oxidation and disinfection boost in finished water storage.

In this case, as shown in FIG. 7 chlorine dioxide and/or chloramine may be added at the entrance to the finished water storage 134 as shown by arrow 196. Since the finished water typically has low chlorine dioxide demand, and the retention time in the finished water storage 134 is typically long, a relatively low dose of chlorine dioxide in the finished water may provide adequate CxT for primary disinfection, even if the monochloramine remaining from injection in the raw water is not adequate. Monochloramine injected into the finished water storage will mostly be carried on as a residual in the distribution system.

Figure 8:
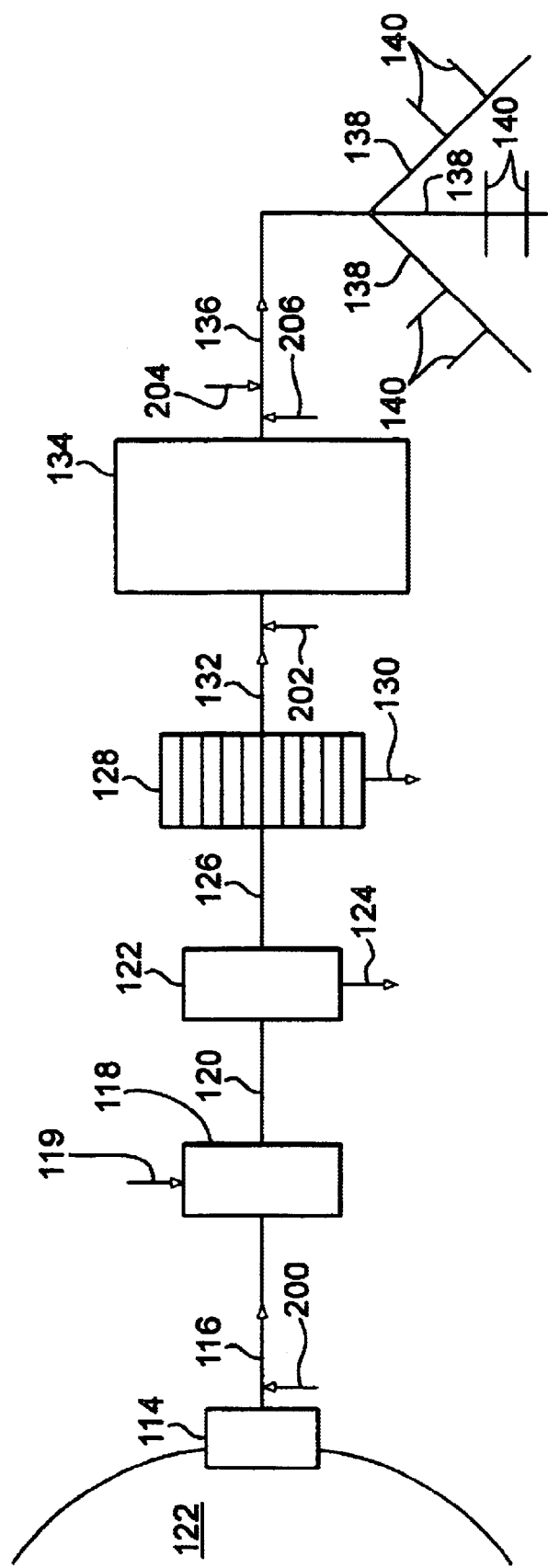
FIG. 8 is a schematic representation of a process according to the present invention using chlorine dioxide pre-oxidation and disinfection with monochloramine as a residual disinfectant.

As shown in FIG. 8, separate streams of chlorine dioxide and chlorine can be used in the process. The chlorine dioxide, represented by arrow 200, can be introduced into the raw water main 116 while chlorine, represented by arrow 202, can be introduced into the water as it enters the finished water storage 134. In addition, chlorine, represented by arrow 204, and ammonia, represented by arrow 206, can be introduced into the delivery main 136 for finished water to create monochloramine in the finished water that is being delivered to points of use.

A number of water plants are planning to convert from the use of chlorine as a disinfectant to a combination of chlorine dioxide and monochloramine disinfectant, using hauled-in chlorine and chlorine dioxide generators such as the type offered for sale by CDG Technology, Inc. of Bethlehem, Pa. At one plant that was using chlorination until recently, chlorinated organics (THM's) in the finished water were typically greater than 170micrograms per liter, compared to a regulatory limit of 100 micrograms per liter. (This regulatory limit is expected to be reduced to 80 micrograms per liter during the year 2001.) A chlorine dioxide generator was installed in this plant to oxidize raw water in conjunction with traditional chloramination to achieve disinfection in the finished water. As a result, THM's were reduced to below 5 micrograms per liter.

Applicants have shown several new processes for using mixed streams of chlorine chlorine dioxide and ammonia in the treatment of drinking water. The use of these new processes helps to overcome the various problems associated with prior art processes.

Applicants can, by various process schemes, provide water with residual disinfectant that contains amounts of regulated disinfection by-products well below regulatory limits, provides high-level disinfection and avoids the productions of noxious odors at the tap.

Having thus described our invention, what is desired to be secured by Letters Patent of the United States is set forth in the appended claims, which should be read without limitation.

What is claimed:

1. A method for treating water as it proceeds from a source to a storage or distribution facility comprising the steps of:
    injecting a mixture of chlorine and chlorine dioxide into said water at a location between said source and said storage or distribution facility; and
    injecting ammonia into said water at either a point upstream or downstream of said location where said chlorine and chlorine dioxide are injected into said water, said ammonia being injected in an amount to react substantially with said chlorine, whereby said water in said storage or distribution facility contains chlorine dioxide, monochloramine and a negligible amount of chlorine.

2. A process according to claim 1 including the step of establishing the chlorine:ammonia ratio at or below 5:1 by weight.

3. A process according to claim 1 including the step of injecting the ammonia downstream of the chlorine/chlorine dioxide injection point, but sufficiently close to the chlorine/chlorine dioxide injection point so that substantially all of the chlorine is converted to monochloramine before chlorinated organics can be formed at levels that are above acceptable limits.

4. A process according to claim 1 wherein the water is contaminated raw water and the treatment process includes the step of applying the ammonia/chlorine/chlorine dioxide stream to the raw water before other treatment steps.

5. A process according to claim 4 including the step of applying the ammonia/chlorine/chlorine dioxide stream in a raw water main near the intake of the main wherein the chlorine dioxide reacts with contaminants as the raw water flows through said main.

6. A process according to claim 1 including the steps of injecting the chlorine dioxide early enough in the process so that chlorine dioxide is at an acceptable level for entry into the water distribution system.

7. A process according to claim 1 including the step of creating enough monochloramine to be carried through all treatment steps following its creation to provide all or part of the necessary disinfection in a distribution system.

8. A process according to claim 1 including the step of using the ammonia/chlorine/chlorine dioxide stream to either oxidize contaminants or disinfect drinking water with production of chlorinated by-products kept within acceptable limits.

9. A method for treating water wherein a stream containing chlorine and chlorine dioxide is used to treat drinking water, wherein the mixed chlorine/chlorine dioxide stream (either as gas or in solution) is injected into the water being treated, and where the point of injection is after THM precursors are removed from the water, such that the level of chlorinated by-products created is within acceptable limits.

10. A method for treating water comprising the steps of:
    a) providing a stream containing chlorine and chlorine dioxide
    b) separating the mixed chlorine/chlorine dioxide stream into two streams, the first of which contains chlorine dioxide that is substantially chlorine-free, and the second stream contains chlorine with a lower level of chlorine dioxide than in the original stream;

c) injecting the stream of chlorine into said water being treated at point in the process after removal of sufficient organic material such that the level of chlorinated organics created is at or below an acceptable level; and d) using the chlorine dioxide stream to oxidize contaminants and disinfect drinking water at a point in the process before sufficient organics have been removed to allow treatment with a stream containing substantial amounts of chlorine.

11. A process according to claim 10, including the step of injecting ammonia into said water containing chlorine entering a distribution system for treated water to convert said chlorine to monochloramine.

12. A method for treating water using a stream containing chlorine and chlorine dioxide comprising the steps of:

separating the chlorine from the chlorine dioxide to yield a stream of chlorine and a stream of chlorine dioxide;

using said chlorine dioxide to pre-oxidize a stream of raw water prior to further processing, such as clarification, being one of, a combination of, or all of the steps of coagulation, flocculation and sedimentation, filtration, dissolved air flotation, and membrane filtration;

subjecting said water after treatment with chlorine dioxide to further processing, such as clarification being one of, a combination of, or all of the steps of coagulation, flocculation and sedimentation, filtration dissolved air flotation, and membrane filtration; and using said chlorine to disinfect said water after said further processing and prior to storage for distribution.

13. A method according to claim 12 including the step of adding ammonia to said water as it is withdrawn from storage for distribution to create residual monochloramine in said water for distribution.

14. A method according to claim 13 including the step of establishing the initial chlorine:ammonia ratio at or below 5:1 by weight.

15. A method for treating and disinfecting raw or partially treated water comprising the steps of:

introducing a mixture of chlorine, chlorine dioxide and ammonia into said raw or partially treated water to provide disinfection of the water by chlorine dioxide and creation of monochloramine by reaction of chlorine and ammonia;

passing said raw water through subsequent treatment processes, such as clarification being one of, a combination of, or all of the steps of coagulation, flocculation and sedimentation, filtration; dissolved air flotation, and membrane filtration, whereby residual chlorine dioxide is substantially consumed prior to distribution; and collecting a potable finished water containing sufficient residual monochloramine to provide adequate residual disinfection of said finished water.

16. A method according to claim 15 including the step of adding ammonia and chlorine to said potable water as it is introduced into a distribution system to create monochloramine in said water.

17. A method according to claim 16 including the step of establishing the initial chlorine:ammonia ratio at or below 5:1 by weight.

18. A method according to claim 15 including the step of withdrawing a side stream of raw or partially treated water, introducing ammonia, chlorine and chlorine dioxide into said side stream which is then recycled into a main stream of said water.

19. A method of treating contaminated raw water comprising the steps of:

a) introducing a mixture of chlorine dioxide and monochloramine into said raw water to cause pre-oxidation by said chlorine dioxide and introduce monochloramine into said water as it proceeds through subsequent processing steps;

b) passing said water from step "a" through further processes, such as clarification being one of, a combination of, or all of the steps of coagulation, flocculation and sedimentation, filtration, dissolved air flotation, and membrane filtration, to effect solids removal; and c) treating said water after solids removal and prior to storage with one of chlorine dioxide, a mixture of chlorine dioxide and chlorine, or a mixture of chlorine dioxide, chlorine and ammonia for disinfection.

20. A method according to claim 19 including the step of introducing said ammonia at each location at a ratio of chlorine:ammonia of 5:1 or less by weight.

21. A method according to claim 19, including the step of introducing ammonia into water as it is withdrawn from storage when said withdrawn water contains residual chlorine.

22. A method according to claim 21 including the step of introducing said ammonia at a ratio of chlorine:ammonia of 5:1 or less by weight.

23. A method of treating water using streams of chlorine dioxide, chlorine and ammonia comprising the steps of:

a) introducing chlorine dioxide into raw water in a raw water main;

b) subjecting said raw water containing chlorine dioxide to subsequent processing steps such as clarification being one of, a combination of, or all of the steps of coagulation, flocculation and sedimentation, filtration; dissolved air flotation, and membrane filtration;

c) introducing additional chlorine dioxide into said water as it is withdrawn from step "b" and conducted to finished water storage; and d) introducing chlorine and ammonia into water entering finished water storage or as it is withdrawn from storage for distribution to users to provide monochloramine in said water by reaction of chlorine and ammonia.

24. A method according to claim 23 including the step of introducing said ammonia into said water in step "d" at a ratio of chlorine:ammonia of 5:1 or less by weight.

25. A method for treating water processed in a drinking water treatment plant through various process steps, including solids removal, by introducing a mixture of chlorine dioxide and chloramine into said water after said solids-removal step.

26. A method according to claim 25, including the step of preparing said mixture of chlorine dioxide and chloramine by adding ammonia to a mixture of chlorine and chlorine dioxide at a ratio of chlorine:ammonia of 5:1 or less by weight.

27. A method according to claim 25, including the step of withdrawing a side stream of water after said solids removal step, introducing chlorine dioxide and monochloramine into said side stream, and injecting said side stream of water containing chlorine dioxide and monochloramine into said water downstream of where said side stream is withdrawn.

28. A method according to claim 24 including the step of withdrawing a side stream of water after said solids-removal step, introducing chlorine dioxide, chlorine and ammonia into said side stream, said chlorine:ammonia ratio being 5:1 or less in said side stream, and introducing said side stream into said water downstream of where said side stream is withdrawn.

29. A method for treating water comprising the steps of:
   a) providing a stream containing gaseous chlorine and chlorine dioxide
   b) passing at least a portion of the gaseous chlorine and chlorine dioxide stream through a porous bed of sodium chlorite to yield a first stream of chlorine dioxide;
   c) separating the remaining portion of the mixed chlorine/chlorine dioxide gas stream into two streams, the first of which contains chlorine dioxide that is substantially chlorine-free, and the second stream contains chlorine with a lower level of chlorine dioxide than in the original stream;
   d) injecting the stream of chlorine into said water being treated at point in the process after removal of sufficient organic material such that the level of chlorinated organics created is at or below an acceptable level; and
   e) combining the first stream of chlorine dioxide and the stream of chlorine dioxide substantially free of chlorine into a mixed chlorine dioxide stream and using the mixed chlorine dioxide stream to oxidize contaminants and disinfect the water at a point in the process before sufficient organics have been removed to allow treatment with a stream containing substantial amounts of chlorine.

30. A process according to claim 29 including the step of injecting ammonia into said water containing chlorine entering a distribution for treated water system to convert said chlorine to monochloramine.

31. A method for treating water using a stream containing gaseous chlorine and chlorine dioxide comprising the steps of:
   passing at least a portion of the stream containing gaseous chlorine and chlorine dioxide through a porous bed of sodium chlorite to yield a stream of chlorine dioxide;
   separating the remaining portion of the chlorine from the chlorine dioxide to yield a stream of chlorine and a stream of chlorine dioxide containing negligible amounts of chlorine;
   combining said stream of chlorine dioxide and said stream of chlorine dioxide containing negligible amounts of chlorine into a mixed chlorine dioxide stream and using said mixed chlorine dioxide stream to pre-oxidize a stream of raw water prior to further processing, such as clarification being one of, a combination of, or all of the steps of coagulation, flocculation and sedimentation, filtration, dissolved air flotation, and membrane filtration; and
   using said chlorine to disinfect said water after further processing, such as clarification being, one of, a combination of, or all of the steps of coagulation, flocculation and sedimentation, filtration, dissolved air flotation, and membrane filtration and prior to storage for distribution.

32. A method according to claim 31 including the step of adding ammonia to said water as it is withdrawn from storage for distribution to create monochloramine in said water for distribution.

33. A method according to claim 32 including the step of establishing the initial chlorine:ammonia ratio at or below 5:1 by weight.

34. A method for treating water comprising the steps of:
   a) providing a stream containing gaseous chlorine and chlorine dioxide
   b) passing the mixed chlorine/chlorine dioxide stream through a porous bed of sodium chlorite to produce a stream of substantially pure chlorine dioxide;
   c) injecting chlorine into said water being treated at a point in the process after removal of sufficient organic material such that the level of chlorinated organics created is at or below an acceptable level; and
   d) using the chlorine dioxide stream to oxidize contaminants and disinfect drinking water at a point in the process before sufficient organics have been removed to allow treatment with a stream containing substantial amounts of chlorine.

35. A process according to claim 34 including the step of injecting ammonia into said water containing chlorine entering the distribution system to convert said chlorine to monochloramine.

\* \* \* \* \*